US007548963B2

(12) United States Patent  
Devarakonda et al.

(10) Patent No.: US 7,548,963 B2  
(45) Date of Patent: Jun. 16, 2009

(54) SYSTEM AND METHOD FOR GENERATING A MULTI-PLAN FOR A MULTI-LAYER STORAGE AREA NETWORK

(75) Inventors: Murthy V. Devarakonda, Peekskill, NY (US); David Alson George, Somers, NY (US); Sandeep Kumar Gopisetty, Morgan Hill, CA (US); Kang-Won Lee, Nanuet, NY (US); Konstantinos Magoutis, New York, NY (US); Ramani Ranjan Routray, San Jose, CA (US); Gauri Shah, Santa Clara, CA (US); Chung-Hao Tan, San Jose, CA (US); Norbert George Vogl, Mahopac, NY (US); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 11/177,189

(22) Filed: Jul. 9, 2005

(65) Prior Publication Data

US 2007/0011197 A1   Jan. 11, 2007

(51) Int. Cl.  
*G06F 15/177* (2006.01)

(52) U.S. Cl. .................. 709/220; 709/221; 709/222

(58) Field of Classification Search .......... 709/220  
See application file for complete search history.

(56) References Cited

U.S. PATENT DOCUMENTS 6,681,309 B2   1/2004   Szendy et al.  
2003/0189929 A1* 10/2003 Matsuzaki et al. .......... 370/389

FOREIGN PATENT DOCUMENTS

JP          10063595 A       3/1998  
WO    WO 2005/008439 A2    1/2005

OTHER PUBLICATIONS

Julie Ward, Michael O'Sullivan, Troy Shahoumian and John Wilkes, Appia: automatic storage area network fabric design, Jan. 28-30, 2002, USENIX Association, all pages.*

(Continued)

*Primary Examiner*—Bunjob Jaroenchonwanit  
*Assistant Examiner*—Kevin S Mai  
(74) *Attorney, Agent, or Firm*—Shimokaji & Associates, P.C.; Samuel A. Kassatly (57) ABSTRACT

A multi-plan generation system generates a multi-plan for a multi-layer storage area network. The system generates a predetermined number of plans while generating and retaining globally optimum plans. The system dynamically calculates and orders these plans according to optimization criteria and user requirements. The system comprises a planner for each of the layers in a storage area network such as a host planner, a storage planner, a network planner, a zone planner, etc. Each of the planners applies a variance optimization, a preview optimization, and a detail optimization and interacts with a policy repository to obtain policy guidance, enabling the system to prune the set of plans. A control module invokes the planners in a predetermined order.

7 Claims, 6 Drawing Sheets

OTHER PUBLICATIONS

Renato John Recio, "Server I/O Networks Past, Present, and Future," ACM SIGCOMM 2003 Workshops, Aug. 25&27, 2003, Karlsruhe, Germany.

Chien SA et al., "A hierarchical architecture for resource allocation, plan execution, and revision for operation of a network of communications antennas," Abstract, Proceedings, 1997 IEEE International Conference on Robotics and Automation (Cat. No. 97CH35992), Pt. vol. 4, pp. 3340-3347 vol. 4, 1997.

Parameswaran N. Jaidev, "Planet: A tool for representing and generating plans in an RMS framework," Third International Conference on Tools for Artificial Intelligence TAI '91 (Cat. No. 91CH3054-4), San Jose, CA, USA, pp. 108-109, 1991.

* cited by examiner

SYSTEM AND METHOD FOR GENERATING A MULTI-PLAN FOR A MULTI-LAYER STORAGE AREA NETWORK

FIELD OF THE INVENTION

The present invention generally relates to generating plans for a multi-layer storage area network; the plans comprise selection and configuration of devices within each of the layers in the storage area network.

BACKGROUND OF THE INVENTION

A design process for a storage area network comprises determining host, network, and storage design components. Domain specific planning tools are available in various domains such as network planners, database query optimizers, storage capacity, and server capacity planners. The same type of underlying mathematical optimization algorithms can be used in each of these different domains (such as best-fit bin packing, linear programming, etc.); however, the input requirements, input constraints, and components of the cost model are different in each of these domains. Consequently, the requirements of plan generation for a storage area network are unique because this design space spans hosts, network and storage domains.

Conventional design tools for storage area networks typically output only a single integrated design across the host, network, and storage layers of the storage area network. Some conventional design tools for storage area networks require a system designer to select a pre-existing design template (cookie-cutter approach). These pre-packaged device templates guide the design process of the storage area network. However, selecting a pre-existing template can lead to over-provisioning. The pre-existing template does not allow optimization of a design for a particular implementation of a storage area network with respect to cost, physical space, power utilization, etc.

Conventional storage area network planning tools do not perform integrated planning across the different layers. That is, there are network planners that only provide multiple plans for only the network layer, or the storage planner that only provides multiple plans for the storage layer. These conventional planners do not consider inter-layer optimization issues.

When using conventional design tools for storage area networks, generating additional plans across the different layers of the storage area network leads to combinatorial explosion. For example, host planning generates four possible different alternatives, storage planning generates five independent planning alternatives, and network planning generates six other independent planning alternatives. Consequently, identifying an optimum solution requires evaluation of a total of 4*5*6 (120) plans. If a plan considers types of devices and different manufacturers, each having different costs, then the whole planning process takes a long time to complete.

Although conventional design tools for storage area networks have proven to be useful, it would be desirable to present additional improvements. Currently, conventional storage area network planning tools do not have the capability to dynamically change the amount of plan information generated. For example, in some cases, the users only want to obtain a rough idea on the number of devices being used (i.e. they do not want storage configuration or fabric interconnectivity information), in other cases users want more detailed plan information. For example, when a vendor is proposing solutions at a customer site, a planning tool needs to quickly provide high-level information about cost. Subsequently, during a deployment phase, the planning tool needs to generate installation and configuration scripts.

There currently exists no method capable of generating additional plans (with low over-provisioning) that span across host, storage, and network layers, and ordering these generated plans according to one or more optimization criteria (such as cost, or power consumption or physical space). Furthermore, there is no planning tool currently available that allows a user to specify a high-level plan or a detailed plan, as needed. There are no planners that allow the users to specify the layer in which they would like to see a higher variety of plans. For example, in the integrated generated plans, the users would like to see more variety in the output plans with respect to the network layer, or the storage layer. What is therefore needed is a system, a computer program product, and an associated method for generating a multi-plan for a multi-layer storage area network. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for generating a multi-plan for a multi-layer storage area network. The present system comprises an overall plan generator mechanism that minimizes the total number of plans passed between different layers while still generating and retaining globally optimum plans. As used herein, a "layer" corresponds to one of hosts, fabric, storage arrays, or zones.

The present system comprises a multi-layer (across host, storage, network, zone, other layers) plan generator that quickly generates a predetermined number of plans. The present system orders these plans according to optimization criteria and user requirements. The present system does not require preconfigured templates; rather, the present system dynamically calculates these plans based on application level user requirements with respect to criteria such as, for example, performance, availability, security, and future growth.

The present system comprises a planner for each of the layers in a storage area network. Exemplary planners comprise a host planner, a storage planner, a network planner, a zone planner, and planners for other layers (collectively referenced as planners). In an exemplary planning process, the host planner generates alternate plans that utilize different numbers and types of host bus adapters. The host plans are provided as input into the storage planner.

The storage planner determines the number and type of storage controllers. The storage planner further determines a number of storage pools and specific configuration requirements (such as the RAID level, stripe level, etc.) for the storage pools to satisfy user performance requirements. The combined host and storage planner output generated by the storage planner are provided to the network planner to determine the number and type of required switches. The network planner further determines network fabric interconnectivity.

Each of the planners interacts with a policy repository in a policy database to obtain policy guidance. The policy guidance enables the present system to prune the available set of valid plans. A control module invokes the planners in a predetermined order. To each of the planners, the control module also passes application performance, availability, future growth, security requirements, and other user input.

The present system performs planning as a layered process where the host planner performs host specific planning with respect to the number and type of host bus adapters and the host bus adapter configuration. Based on the host planner output, the storage planner performs planning with respect to the type and number of storage arrays and the storage pool and volume configuration. Based on the combined host and storage planner output, the network planner performs planning with respect to the number of switches and fabric interconnectivity.

The present system applies a variance optimization, a look ahead (or preview optimization), and a detail optimization. The variance optimization allows a user to select a layer in the storage area network to receive a greater variety of generated plans.

The preview optimization enables the present system to preview plans generated for other layers to determine whether plans generated at a current layer are incompatible with plans generated for other layers. This allows the layers to prune the less optimal plans at the subsequent layers. For example, the host planner sends its plans to the storage planner and quickly determines which of the host plans will lead to a better solution when considered in conjunction with the storage layer plan extensions. The host planner prunes the suboptimal plans.

Independent planning and optimization at each sub-planner and combining the results at the end may result in suboptimal plans because each sub-planner may fall into local optima. The preview optimization of the present system uses a port-based cost model that predicts features in layers not yet processed such as, for example, a number of switches required by the network layer. The preview optimization allows the host planner, the storage planner, the network planner, the zone planner, and planners for other layers to prune costly or incompatible alternatives.

For example, based on plans generated by the host planner and logical flow information obtained from the user input, the storage planner may generate a plan using several low end storage devices instead of a high end storage system to reduce the storage cost. However, after the network planner configures a storage area network fabric for the storage devices, the overall cost may be more expensive than a plan with a high-end storage because the plan generated by the storage planner required more expensive switches (with more FC ports). Using preview optimization, the storage planner knows "in advance" how a generated plan affects the operation of the network planner and consequently the overall plan.

Preview optimization utilizes communication between planners passing simple parameters and fast calculation of cost at one planner to provide "hints" to another planner. For example, once storage plans have been generated by the storage planner, the storage planner can compute the total number of ports required by the host layer and the storage devices required by the storage layer. The storage planner can pass these values to the network planner; the network planner subsequently estimates the number and type of switches required to support the plan generated by the storage planner. The network planner returns the estimate or "hint" back to the storage planner. Using this hint the storage planner selects one or more plans.

In one embodiment, an approximate cost calculation at the network planner can be facilitated by a fixed number of resizable storage area network fabric templates. Selected storage area network fabric templates comprise core-edge design, core-only design, co-located design, etc. These fabric templates are patterned after actual storage area network fabric configurations that are widely used in storage area networks due to resilience, scalability, and ease of maintenance. Using these fabric templates, the network planner can quickly calculate the number of switches required to support plans generated by the host planner and the storage planner.

The detail optimization enables a user to specify an amount of detail provided in the generated plans. Detail optimization provides flexibility with respect to the amount of time required to generate a single plan. Thus, in cases where not many details are required in a plan, detail optimization allows a user to generate several overview or high-level plans within the same time period as required to generate one detailed plan.

The present system may be embodied in a utility program such as a multi-plan generation utility program. The present invention also provides means for the user to identify a set of optimum plans for a storage area network by specifying a set of requirements for the storage area network and then invoking the multi-plan generation utility (feature) to generate such plans. The set of requirements comprises a desired number of generated plans, a layer at which plan variance is desired, a storage requirement, an optimization criterion, a network type, a set of devices in the form of, for example, a device catalogue database, and user preferences with respect to a number, a type, or a manufacturer of devices.

The host planner starts a variance optimization plan. The present system determines whether the host layer is the resolution layer, i.e., whether the host layer is specified as a variance layer. If the host layer is specified as the resolution layer, the host planner generates X optimization plans. If the host layer is not specified as the resolution layer, the host planner generates Y optimization plans. Values for X and Y are predetermined; X is greater than Y.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1A:
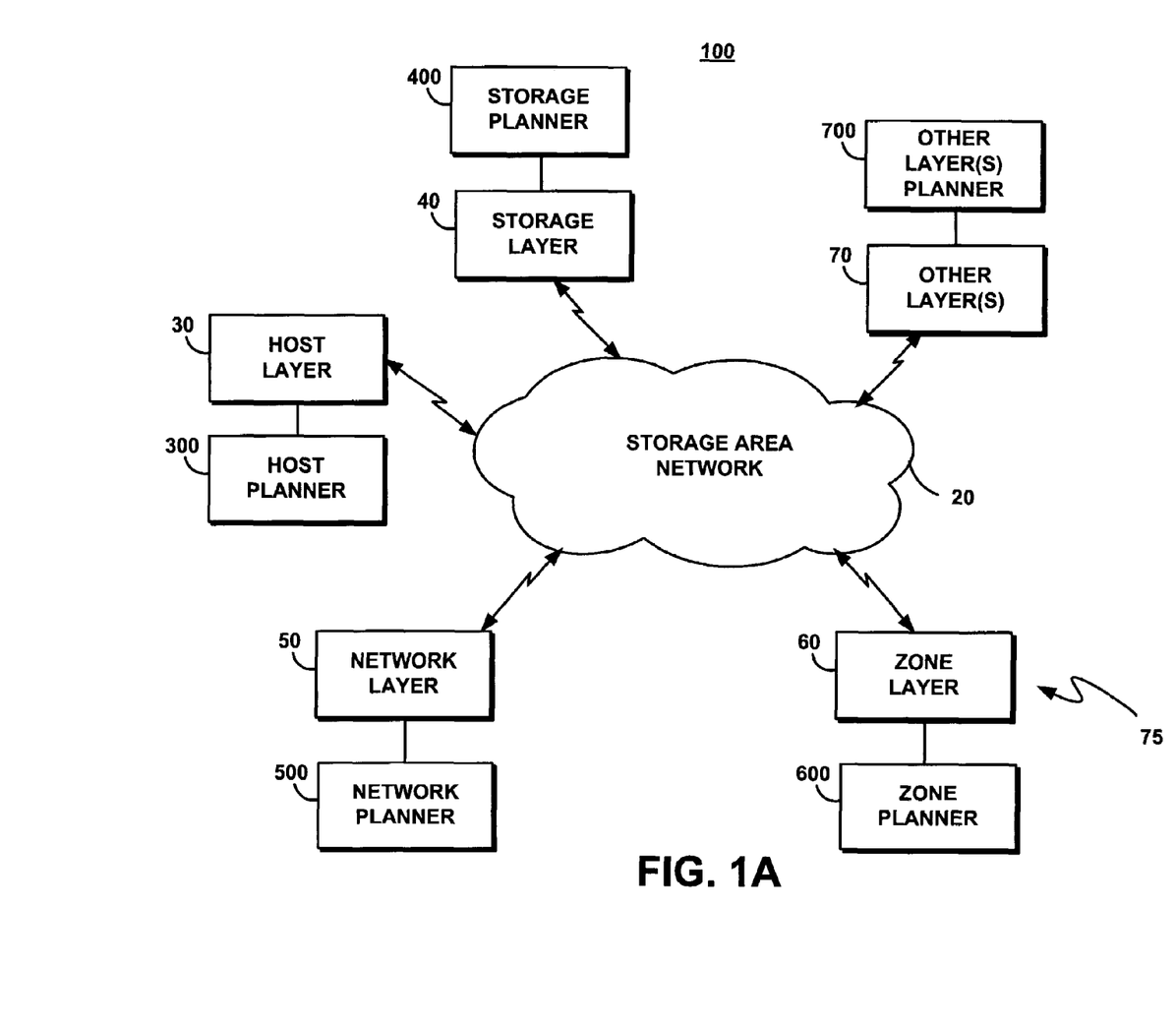
FIG. 1 is comprised of FIGS. 1A and 1B and represents a schematic illustration of an exemplary operating environment in which a multi-plan generation system of the present invention can be used.
Figure 1B:
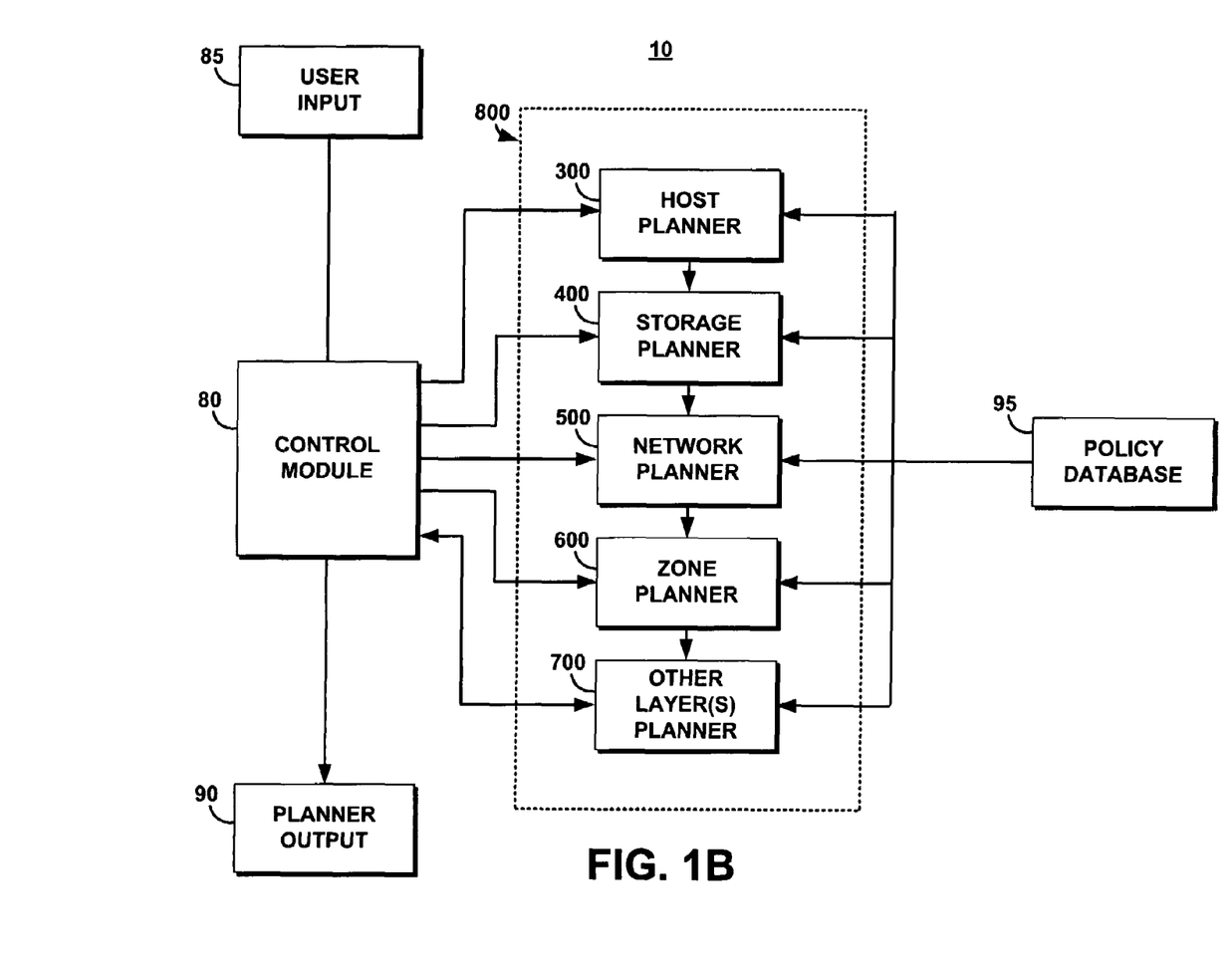

FIG. 1 (FIGS. 1A and 1B) portrays an exemplary overall environment in which a system, a service, a computer program product, and an associated method for generating a multi-plan for a multi-layer storage area network (the "system 10") according to the present invention may be used. System 10 comprises a software programming code or a computer program product that is typically embedded within, or installed on a computer. Alternatively, system 10 can be saved on a suitable storage medium such as a diskette, a CD, a hard drive, or like devices.

A multi-layer storage area network 100 comprises a network 20 connecting layers such as a host layer 30, a storage layer 40, a network layer 50, a zone layer 60, and other layer(s) 70 (collectively referenced as layers 75). System 10 comprises planners for each of the layers 75: a host planner 300, a storage planner 400, a network planner 500, a zone planner 600, and other layer planners 700, collectively referenced as planners 800. System 10 further comprises a control module 80 for receiving user input 85 from a user, invoking each of the planners 800, and providing planner output 90 to the user. System 10 comprises a policy database 95 that comprises a policy repository. The policy repository comprises policy guidance that enables the planners 800 to prune an available set of valid plans. The policy database 90 further comprises one or more device catalogue databases for use in selecting potential devices for plans generated for layers 75 of the multi-layer storage area network 100.

User input 85 comprises a desired number of generated plans, a specified layer in which variance is desired, storage requirements for the storage layer 40, optimization criteria for the generated plans, a network type for the network layer 50, a selected device catalogue, and user preferences with respect to a number, a type, or a manufacturer of devices to be considered by system 10 during generation of the multi-plan.

Specifying a layer in which variance is desired allows a user to specify one of the layers 75 at which planning is performed in finer resolution as compared to planning for other layers 75. The user is given the choice of seeing more variety in the plans with respect to a specific layer. For example, the customer desires a maximum of 10 plans with more variety in the plans with respect to the storage layer 40. System 10 increases a variance in the plans generated for the storage layer 40 and reduces a variance in the generated plans with respect to host layer 30, network layer 50, zone layer 60, and other layers 70. System 10 uses customer preference information from user input 85 to prune the device types for the host layer 30, network layer 50, zone layer 60, and other layers 70, thus reducing overall planning time.

Figure 2:
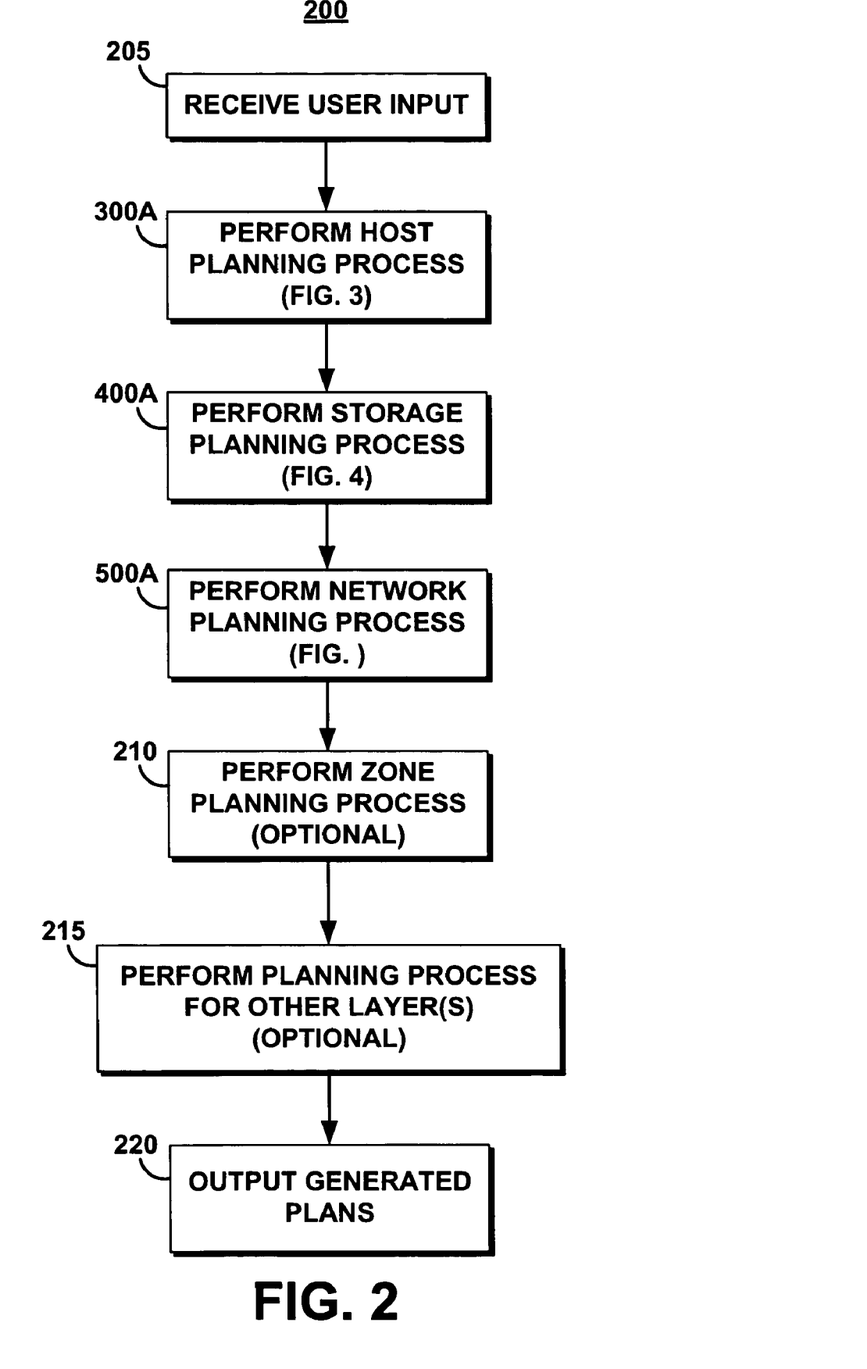
FIG. 2 is a process flowchart illustrating a method of operation of a control module of the multi-plan generation system of FIG. 1.

FIG. 2 is a process flow chart illustrating a method 200 of system 10 in generating a multi-plan for the multi-layer storage area network 100. System 10 receives user input (step 205). System 10 performs a host planning process (step 300A, further described in FIG. 3), generating a predetermined number of plans for the host layer 30 with input from the user input 85 and the policy database 95. System 10 performs a storage planning process (step 400A, further described in FIG. 4), generating a predetermined number of plans for the storage layer 40 with input comprising the user input 85, the policy database 95, and output of the host planner 300. System 10 performs a network planning process (step 500A, further described in FIG. 5), generating a predetermined number of plans for the network layer 50 with input comprising the user input 85, the policy database 95, and output of the storage planner 400.

System 10 optionally performs a zone planning process (step 210), generating a predetermined number of plans for the zone layer 60 with input comprising the user input 85, the policy database 95, and output of the network planner 500. System 10 optionally performs a planning process for other layer(s) 70 (step 215), generating a predetermined number of plans for the other layer(s) 70 with input comprising the user input 85, the policy database 95, and output of the zone planner 600. System 10 outputs generated plans (step 215) as planner output 90.

Figure 3:
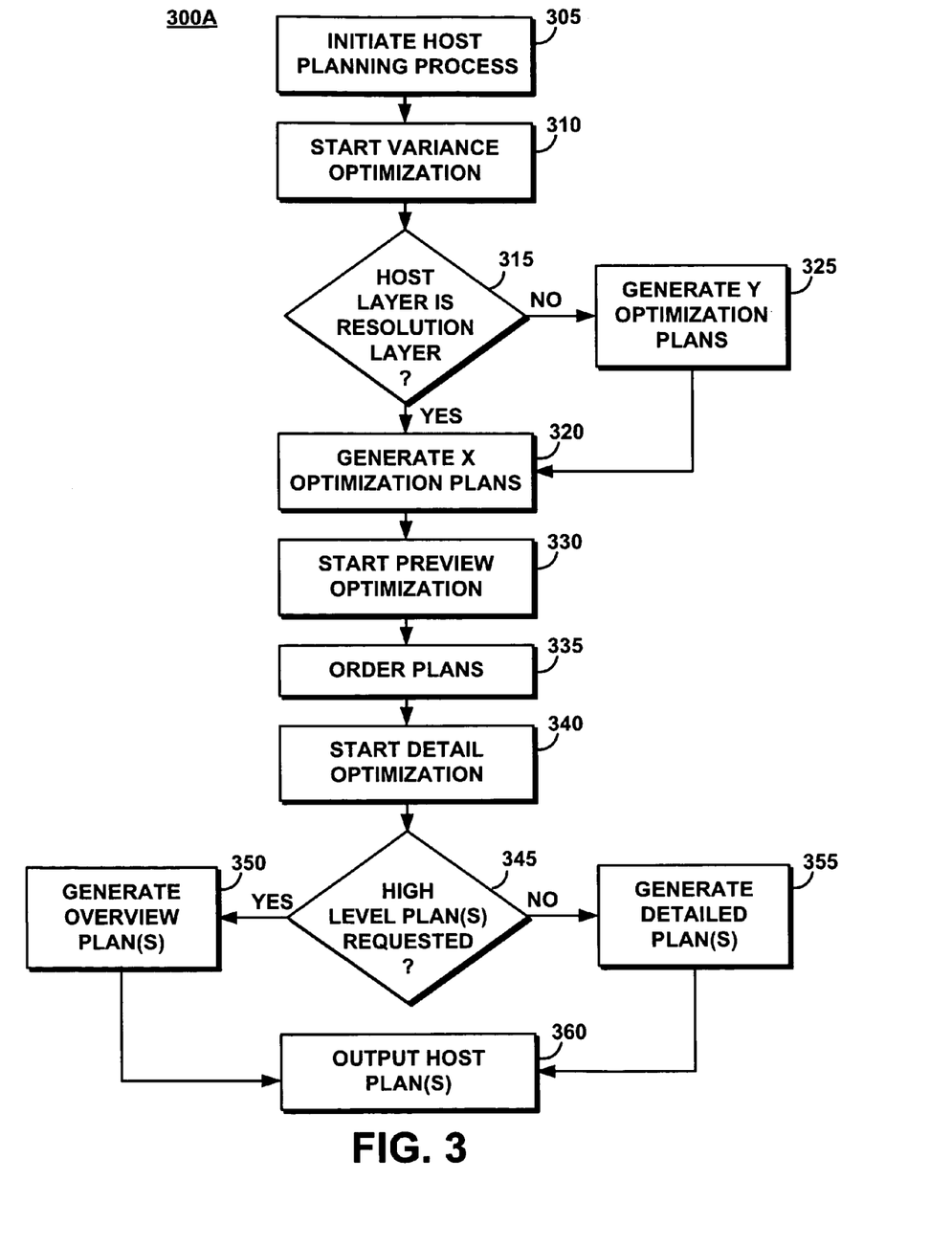
FIG. 3 is a process flow chart illustrating a method of operation of a host planner of the multi-plan generation system of FIG. 1.

FIG. 3 illustrates a method 300A executed by the host planner 300. Input to the host planner 300 comprises user input 85 and input from the policy database 95. The control module 80 initiates a host planning process (step 305). The host planner 300 starts a variance optimization plan (step 310). System 10 determines whether the host layer 30 is the resolution layer (decision step 315); i.e., whether the host layer 30 is specified as a variance layer. If the host layer 30 is specified as the resolution layer, the host planner 300 generates X optimization plans (step 320). If the host layer is not specified as the resolution layer, the host planner 300 generates Y optimization plans (step 325). Values for X and Y are predetermined; X is greater than Y. In one run, the output of the host planner 300 sends X number of inputs, while in another run it might send Y number of inputs, depending on the desired variance level at the host planner 300.

The host planner 300 starts the preview optimization plan (step 330). The host planner 300 uses the preview optimization plan to predict features in layers 75 that have not yet been planned but may result in generating suboptimal plans. The host planner 300 orders the generated plans according to user provided criteria in the user input 85 (step 335). Based on results generated by the preview optimization plan, the host planner 300 prunes any costly or incompatible alternatives from the generated plans.

The host planner 300 starts the detail optimization plan (step 540). The host planner determines whether a high-level plan is requested (decision step 345). If a high-level plan is requested the host planner 300 generates an overview plan (step 350). If a high-level plan is not requested, the host planner generates a detailed plan (step 355). The host planner 300 outputs the host plan (step 360).

Figure 4:
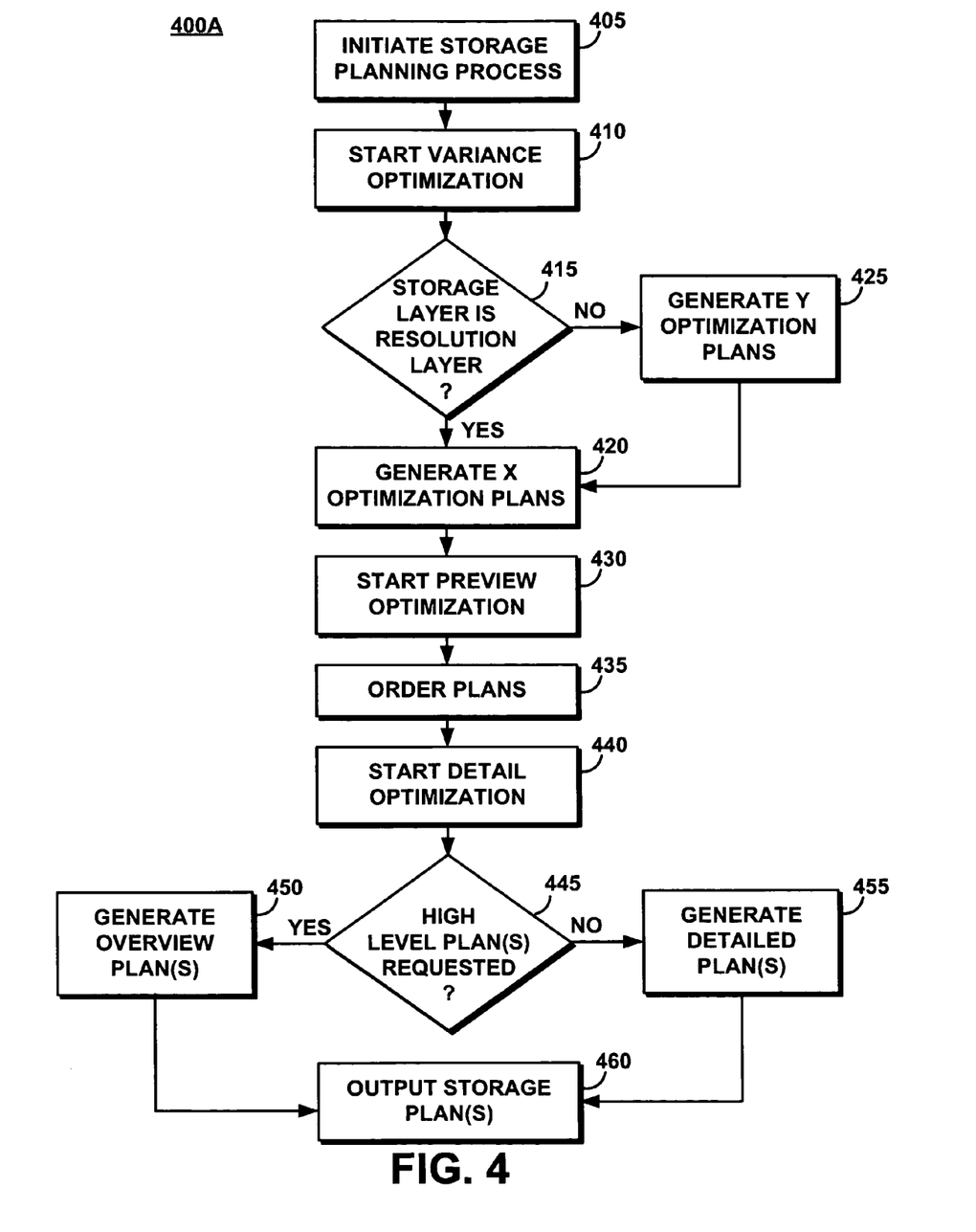
FIG. 4 is a process flow chart illustrating a method of operation of a storage planner of the multi-plan generation system of FIG. 1.

FIG. 4 illustrates a method 400A executed by the storage planner 400. Input to the storage planner 400 comprises user input 85, input from the policy database 95, and the output of the host planner 300. The control module 80 initiates a storage planning process (step 405). The storage planner 400 starts a variance optimization plan (step 410). System 10 determines whether the storage layer 40 is the resolution layer (decision step 415); i.e., whether the storage layer 40 is specified as a variance layer. If the storage layer 40 is specified as the resolution layer, the storage planner 400 generates X optimization plans (step 420). If the storage layer is not specified as the resolution layer, the storage planner 400 generates Y optimization plans (step 425). Values for X and Y are predetermined; X is greater than Y.

The storage planner 400 starts the preview optimization plan (step 430). The storage planner 400 uses the preview optimization plan to predict features in layers 75 that have not yet been planned but may result in generating suboptimal plans. The storage planner 400 orders the generated plans according to user provided criteria in the user input 85 (step 435). Based on results generated by the preview optimization plan, the storage planner 400 prunes any costly or incompatible alternatives from the generated plans.

The storage planner 400 starts the detail optimization plan (step 540). The storage planner determines whether a high-level plan is requested (decision step 445). If a high-level plan is requested the storage planner 400 generates an overview plan (step 450). If a high-level plan is not requested, the storage planner generates a detailed plan (step 455). The storage planner 400 outputs the storage plan (step 460).

If plan variance is desired in the storage layer 40, the storage planner 400 selects the host plan that is optimum with respect to user provided criterion and discards one or more of the remaining host plans. The storage planner 400 determines an optimum host plan by identifying, for example, the lowest cost alternative if cost is the optimization criteria. The storage planner 400 then passes each of the host plans through a preview cost determination formula in the preview optimization to verify that the lowest cost alternative is still the desired optimum plan.

The storage planner 400 retrieves some or all of the possible storage devices that satisfy storage device preferences provided by the user in user input 85. The storage planner 400 performs interoperability checking between the host and the retrieved storage devices. The storage planner 400 prunes away all but the optimum host plan(s). The storage planner 400 further prunes away storage controllers that are not interoperable.

The remaining set of storage controllers can be of different types (with respect to the storage capacity limit) and from different manufacturers. If the user has specified preference for a specific storage controller, then the storage planner 400 uses that controller for the storage plan. Otherwise, the storage planner 400 generates plans based on different device types rather than manufacturers. For example, the storage planner 400 can use either six mid-range storage controllers to generate plans or three high-end storage controllers to generate other possible plans. The storage planner 400 filters out the controller types based on policies (such as future growth, availability, copy services requirements).

For each controller type, the storage planner 400 determines the number of required controllers. The storage planner 400 uses the preview optimization to determine a rough network fabric overhead for each controller type. The storage planner 400 orders or ranks the storage controller preference based on results of the preview optimization.

The storage planner 400 generates the desired number of plans based on the remaining storage controller types. Based on the desired plan detail level, the storage planner generates the appropriate amount of information in the storage plan. The storage planner 400 forwards these generated plans to the network planner 500

Figure 5:
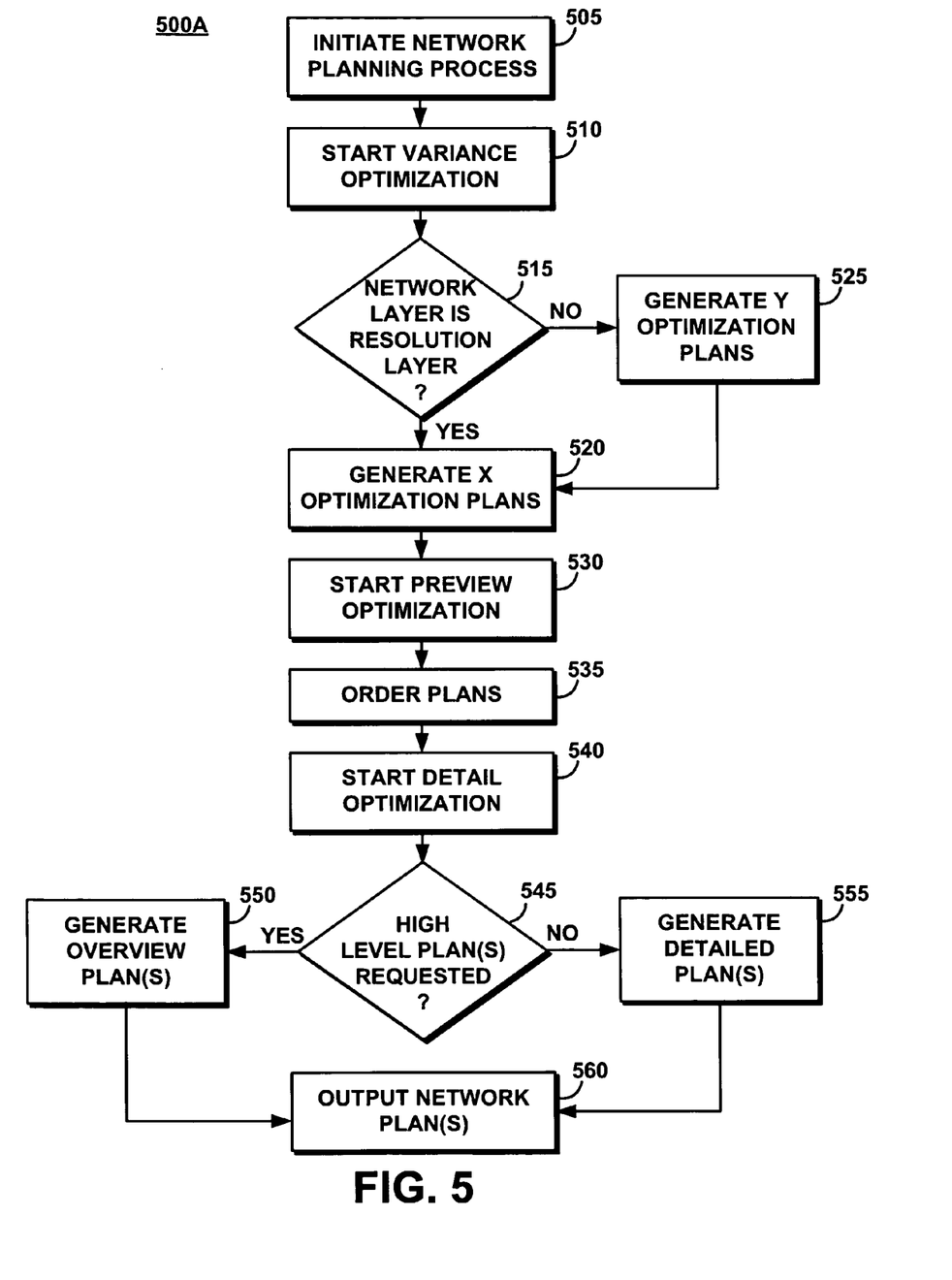
FIG. 5 is a process flow chart illustrating a method of operation of a network planner of the multi-plan generation system of FIG. 1.

FIG. 5 illustrates a method 500A executed by the network planner 500. Input to the network planner 500 comprises user input 85, input from the policy database 95, and the output of the storage planner 400. The control module 80 initiates a network planning process (step 505). The network planner 500 starts a variance optimization plan (step 510). System 10 determines whether the network layer 50 is the resolution layer (decision step 515); i.e., whether the network layer 50 is specified as a variance layer. If the network layer 50 is specified as the resolution layer, the network planner 500 generates X optimization plans (step 520). If the network layer is not specified as the resolution layer, the network planner 500 generates Y optimization plans (step 525. Values for X and Y are predetermined; X is greater than Y.

The network planner 500 starts the preview optimization plan (step 530). The network planner 500 uses the preview optimization plan to predict features in layers 75 that have not yet been planned but may result in generating suboptimal plans. Based on results generated by the preview optimization plan, the network planner 500 prunes any costly or incompatible alternatives from the generated plans. The network planner 500 orders the generated plans according to user provided criteria in the user input 85 (step 535).

The network planner 500 starts the detail optimization plan (step 540). The network planner determines whether a high-level plan is requested (decision step 545). If a high-level plan is requested the network planner 500 generates an overview plan (step 550). If a high-level plan is not requested, the network planner generates a detailed plan (step 555). The network planner 500 outputs the network plan (step 560).

The network planner 500 takes as input each of the plans generated by the storage planner 400 generates an optimum fabric plan. If, for example, the user desires more variance in the storage devices, the network planner 500 does not prune the plans generated by the storage planner 500.

It is to be understood that the specific embodiments of the invention that have been described are merely illustrative of certain applications of the principle of the present invention. Numerous modifications may be made to the present system, method, and computer program for generating a multi-plan for a multi-layer storage area network described herein, without departing from the spirit and scope of the present invention.

What is claimed is:

1. A computer-based method for automatically generating a multi-plan for a multi-layer storage area network, comprising:

defining a plurality of planning layers including: a host layer; a storage device layer; and a network layer;

for each of the planning layers, automatically calculating and ordering a set of plans according to at least one user-defined optimization criterion;

automatically selecting potential devices for each of the planning layers from a plurality of device catalogue databases;

each of the planning layers applying any one or more of a variance optimization, a preview optimization, a detail optimization, to prune the set of plans to one or more optimal plans, and for the host layer, storage layer and network layer the variance optimization comprises specifying a desired amount of variance in generated plans, and inputting to each said planning layer planner data from a user and a policy database, performing variance optimization planning, determining if said planning layer is specified as a variance layer, generating a first predetermined number of optimization plans when said planning layer is specified as a variance layer, generating a second predetermined number of optimization plans when said planning layer is not specified as a variance layer, and said first predetermined number of optimization plans is greater than said second predetermined number of optimization plans;

the preview optimization comprises previewing plans for planning layers and performing preview optimization planning and predicting features in each of the planning layers that result in suboptimal plans, ordering generated plans according to user input, determining whether plans generated in a current layer are incompatible with plans generated for other layers, and pruning costly and incompatible alternatives from the generated plans in the previewed planning layers;

the detail optimization comprises specifying an amount of detail in generated plans, whether high-level plans or more detailed plans, performing detail optimization planning and generating requested high-level plans and detailed plans, and the input to the storage layer includes the output from the host layer and the input to the network layer includes the output from the storage layer;

and generating plan variance in the storage layer by selecting an optimal host plan with respect to user provided criterion and discarding one or more of the remaining host plans;

performing interoperability checking between the host layer and the storage layer; and wherein the above steps for the computer-based method for automatically generating the multi-plan for the multi-layer storage area network are performed by a computer processor.

2. The method of claim 1, wherein after each of the plurality of planning layers generates candidate plans, each of the plurality of planning layers sends the candidate plans to a corresponding next processing layer.

3. The method of claim 2, wherein the corresponding next processing layer evaluates the candidate plans in view of a layer-specific planning scheme to generate at least one combined plan.

4. The method of claim 3, wherein the corresponding next processing layer sends the at least one combined plan to the planning layer corresponding to the next processing layer.

5. The method of claim 4, wherein the planning layer corresponding to the next processing layer previews the at least one combined plan, and optimizes one or more of the at least one combined plan.

6. The method of claim 5, wherein the planning layer corresponding to the next processing layer optimizes the at least one combined plan with a lower cost of implementation.

7. The method of claim 5, wherein the planning layer corresponding to the next processing layer optimizes one or more of the at least one combined plan by providing planning details for the one or more of the at least one combined plan.

* * * * *